(12) United States Patent
Patil

(10) Patent No.: US 11,256,311 B2
(45) Date of Patent: Feb. 22, 2022

(54) PARTIALLY DISCHARGING A POWER SUPPLY

(71) Applicant: Arm Limited, Cambridge (GB)

(72) Inventor: Sanjay B. Patil, Austin, TX (US)

(73) Assignee: Arm Limited, Cambridge (GB)

(*) Notice: Subject to any disclaimer, the term of this patent is extended or adjusted under 35 U.S.C. 154(b) by 93 days.

(21) Appl. No.: 16/008,345

(22) Filed: Jun. 14, 2018

(65) Prior Publication Data

US 2019/0384368 A1 Dec. 19, 2019

(51) Int. Cl.
*G06F 1/26* (2006.01)
*H04L 9/00* (2022.01)

(52) U.S. Cl.
CPC ............... *G06F 1/26* (2013.01); *H04L 9/003* (2013.01)

(58) Field of Classification Search
CPC ................... G06F 1/26; H04L 9/003
See application file for complete search history.

(56) References Cited

U.S. PATENT DOCUMENTS

| 5,666,006 | A | 9/1997 | Townsley |
| 9,785,177 | B1 | 10/2017 | Coimbra |
| 2007/0057698 | A1 | 3/2007 | Verbauwhede et al. |
| 2010/0059353 | A1 | 3/2010 | Bastholm |
| 2010/0072759 | A1 | 3/2010 | Andosca |
| 2010/0194205 | A1 | 8/2010 | Tokunaga et al. |
| 2011/0047052 | A1 | 2/2011 | Cornish |
| 2011/0205678 | A1 | 8/2011 | Baba |
| 2012/0153910 | A1 | 6/2012 | Bulzacchelli |
| 2014/0167837 | A1 | 6/2014 | Yannette et al. |
| 2014/0268463 | A1 | 9/2014 | Dreps |
| 2019/0007223 | A1* | 1/2019 | Vaidya .............. G09C 1/00 |

FOREIGN PATENT DOCUMENTS

EP    1 113 386    7/2001

OTHER PUBLICATIONS

International Search Report and Written Opinion of the International Searching Authority for PCT/GB2019/051288 dated Jul. 2, 2019 (received Jun. 27, 2019), 15 pages.
Byong-Deok Choi et al., "Symmetric Adiabatic Logic Circuits against Differential Power Analysis" ETRI Journal, vol. 32, No. 1, Feb. 2010, pp. 166-168.
Adi Shamir, "Protecting Smart Cards from Passive Power Analysis with Detached Power Supplies" 2000 Proceedings $2^{nd}$ International Workshop Cryptographic Hardware and Embedded Systems, vol. 1965, Aug. 17, 2000, pp. 71-77.
Final Office Action dated Aug. 5, in co-pending U.S. Appl. No. 16/008,393, 14 pages.

(Continued)

*Primary Examiner* — Kim Huynh
*Assistant Examiner* — Eric Chang
(74) *Attorney, Agent, or Firm* — Nixon & Vanderhye P.C.

(57) ABSTRACT

An apparatus and method are provided for partially discharging a power supply, the apparatus comprising a power supply adapted to supply power to processing circuitry to perform a processing operation and discharge circuitry adapted to partially discharge the power supply after the processing operation is complete.

15 Claims, 8 Drawing Sheets

(56) References Cited

OTHER PUBLICATIONS

International Search Report and Written Opinion of the International Searching Authority dated Jul. 26, 2019 in PCT/GB2019/051286, 14 pages.
U.S. Appl. No. 16/008,393, filed Jun. 14, 2018, Patil.
Office Action dated Mar. 7, 2019 in co-pending U.S. Appl. No. 16/008,393.
Office Action dated Jan. 24, 2020 for co-pending U.S. Appl. No. 16/008,393.
Final Office Action dated Jun. 26, 2020 for co-pending U.S. Appl. No. 16/008,393.
Office Action dated Dec. 16, 2020 for co-pending U.S. Appl. No. 16/008,393.
Final Office Action dated Apr. 7, 2021 for co-pending U.S. Appl. No. 16/008,393.

* cited by examiner

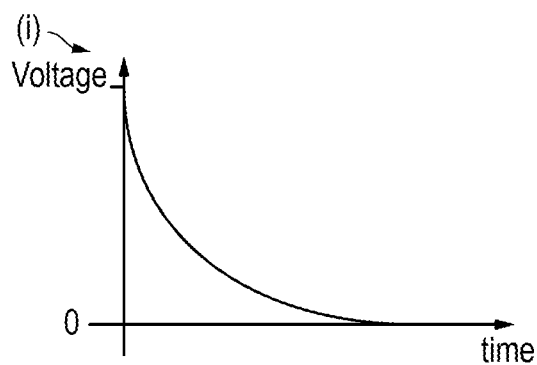
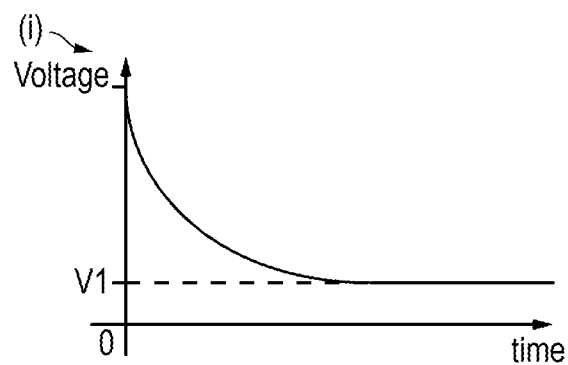
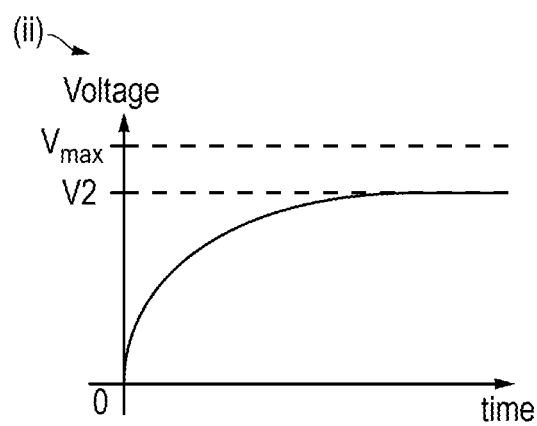
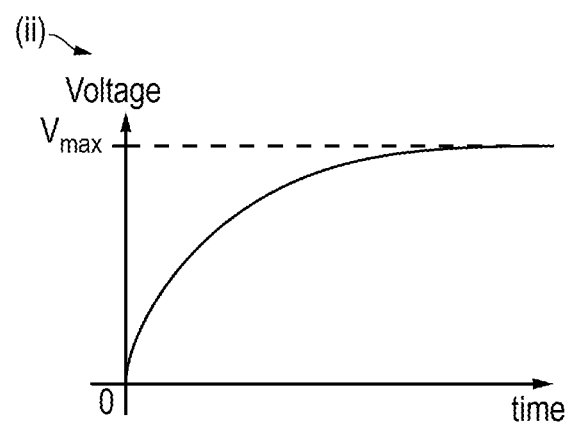
FIG. 4A FIG. 4B

PARTIALLY DISCHARGING A POWER SUPPLY

BACKGROUND

Technical Field

The present technique relates to the field of power supplies.

Technical Background

For some processing operations, it may be useful to provide power, in a secure way, to processing circuitry. A particular example of such a situation is in cryptography, where power usage by cryptographic circuitry can be analysed to determine information about the cryptographic operation performed. This form of attack is known as power analysis, and is a form of side channel attack. A side channel attack is an attack in which information about the physical implementation of, e.g. a cryptographic system, is gathered and used to determine information about the cryptographic operations performed by the system; power analysis in particular involves studying the power consumption of the system over time and using this data to extract secret information from the system, such as cryptographic keys.

It is therefore beneficial to provide power to processing circuitry in a secure way which limits the ability of an attacker to carry out a successful power analysis attack.

SUMMARY

Viewed from one aspect, the present technique provides an apparatus comprising: a power supply adapted to supply power to processing circuitry to perform a processing operation, and discharge circuitry adapted to partially discharge the power supply after the processing operation is complete.

In accordance with the above, by partially discharging the power supply after the processing operation is complete, the amount of charge used by the processing circuitry is obfuscated. The apparatus includes a power supply for supplying power to the processing circuitry and discharge circuitry for partially discharging the power supply, e.g. by reducing the voltage across the power supply to a value greater than zero or by leaving a residual charge in the power supply. The power supply can be any device configured to supply electrical power to an apparatus, such as a capacitor or a battery. In some embodiments, the power supply is configured to supply power to the processing circuitry directly via any electrical connection.

In other embodiments, the power supply is configured to supply power to the processing circuitry indirectly via, for example, a further power supply. The processing circuitry can be any circuitry configured to carry out a processing operation, for example in some embodiments the processing circuitry is cryptographic circuitry. Similarly, the processing operation can be any processing operation, for example the processing operation could be a cryptographic operation. The discharge circuitry allows charge to leave the power supply and be dissipated elsewhere. For example the power could be dissipated within the apparatus as heat. Partially discharging the power supply after a processing operation and dissipating the excess power internally obscures the amount of charge used by the processing circuitry in performing that operation from an outside observer, because an outside observer cannot easily determine how much power was used by processing circuitry and how much was dissipated internally. This impairs the ability of an outside observer to make predictions or determinations about the processing operation carried out by the processing circuitry based on its power usage.

In some embodiments, the discharge circuitry is adapted to partially discharge the power supply by acting as a resistor.

A resistor could be considered to be a device specifically designed to provide electrical resistance, and partially discharges the power supply by converting electrical power into heat. In some embodiments, the discharge circuitry comprises a resistor; in other embodiments, the discharge circuitry comprises components not designed as resistors but intentionally arranged in such a way as to provide a desired level of resistance. For example, transistors can be arranged to behave as resistors, so could be used in place of or in addition to a resistor in the discharge circuitry. By acting as a resistor, the discharge circuitry can partially discharge the power supply by allowing some of the power stored in the power supply to be dissipated within the apparatus as heat. As the power is dissipated internally within the apparatus, an outside observer cannot easily tell how much power has been used by the processing circuitry, as there is no way of determining from the power usage of the device whether power was used in a processing operation, or simply dissipated as heat.

In some embodiments, the discharge circuitry is adapted to discharge the power supply to a threshold value.

The threshold can be specified in terms of, for example, the amount of charge remaining in the device, the minimum voltage across the device, or any other equivalent quantity.

In some embodiments, the threshold value is the same for different processing operations performed by the processing circuitry.

By maintaining the same threshold value for different processing operations, the obfuscation provided by the apparatus can be improved, since every time the power supply is discharged to a given threshold, it will appear that the same amount of charge is used, and thus no variation in the processing operation will be detectable as no variation in the processing operation will change the value to which the power supply is discharged. Different processing operations may be different iterations of the same operation or type of operation, but they may also be entirely different types of operation with different power use profiles (e.g. power use as a function of time).

In some embodiments, the discharge circuitry is adapted to vary the threshold value.

The threshold value can be varied in different ways, for example randomly, as a function of time or based on some user input. In some examples, varying the threshold value can provide further obfuscation of the charge used by further removing predictability from the system, such that it becomes even more difficult for external observers to track power usage. Additionally, by varying the threshold value, if the processing circuitry requires more power than can be provided without going below a certain threshold value, a lower threshold value can be used instead (it should be appreciated that in order to maintain the obfuscation provided by the apparatus, it may be appropriate to set the threshold value at a lower value for some processing operations that use less power, in addition to those that require more power, so that an outside observer will be unable to distinguish between processing operations based on the threshold value).

In some embodiments, the apparatus further comprises selection circuitry configured to select the threshold value from at least two values.

The selection circuitry can, for example, be configured to select the threshold value at random or based on a power efficiency target—e.g. the selection circuitry can select a higher threshold value if a power efficiency target requires high power efficiency, as a higher threshold means the power supply does not need as much power to recharge it, or a lower value if the circuitry is configured to prioritise obfuscation over efficiency. By selecting the threshold value from at least two values, the selection circuitry can vary the threshold value more efficiently.

In some embodiments, the selection circuitry is adapted to select the threshold value based on at least one random input.

By randomising the threshold value, obfuscation can be further improved by removing even more predictability from the system. The random input used to select the threshold value may be generated in any way; ideally the random input will be truly random, however it is appreciated that in reality it is often not practical to generate a truly random value, and thus it will be appreciated that in this context "random input" may also refer to an input generated in a pseudo-random manner.

In some embodiments, the at least two values are multiples.

The threshold can be selected from values that are, for example, multiples of each other, or multiples of a common value. By providing values that are multiples, the apparatus can be implemented more efficiently in hardware with little circuitry as compared to examples where a wider range of values are possible.

In some embodiments, the discharge circuitry is configured to vary the threshold value by selectively activating or deactivating elements in the discharge circuitry.

The discharge circuitry can be configured to vary the threshold value by varying, for example, how many or which elements in the discharge circuitry are active or inactive, or which elements are connected within the circuit. In some examples this is achieved through the use of switches or logic gates to activate or deactivate elements in the discharge circuitry; in other examples this is achieved by bypassing elements in the circuit (as a way of deactivating them). This allows the power supply to be discharged in a controllable way, and provides a controllable way to vary the threshold, thus aiding in the obfuscation of power use.

In some embodiments, the discharge circuitry comprises a first transistor.

The discharge circuitry can, in some examples, include a transistor, such that the power supply is partially discharged due to the internal resistance within the transistor. The first transistor can be of any type, for example it could be a Metal Oxide Semiconductor Field Effect Transistor (MOSFET). Transistors are a particularly useful element for discharge circuitry as they are cheap, widely available and easy to control. In some embodiments the first transistor is the only transistor in the discharge circuitry, while in other embodiments the first transistor is one of multiple transistors.

In some embodiments, the first transistor is a p-type transistor.

When discharging a circuit element such as a power supply using a p-type transistor, the circuit element can only be discharged to a given threshold determined by properties of the p-type transistor, thus leaving a residual charge in the circuit element. Using a p-type transistor is therefore a simple way of partially discharging the power supply. In one example, the p-type transistor is the only transistor in the discharge circuitry, while in other examples it is one of multiple transistors of any type.

In some embodiments, the discharge circuitry further comprises a second transistor connected to the first transistor in series.

Each transistor can be any type of transistor, including, as examples, p-type transistors and n-type transistors. Providing multiple transistors in series increases the possible threshold to which the power supply can be discharged, with each transistor increasing the threshold value. This also makes it possible for the discharge circuitry to vary the threshold by activating or deactivating transistors in the circuit.

In some embodiments, the apparatus further comprises a first power rail and a second power rail arranged such that the power supply and the discharge circuitry are each connected between the first power rail and the second power rail, the first power rail and the second power rail being adapted to deliver charge to and from the power supply.

Power rails can, for example, be electrical contacts with a voltage across them, between which various components may be connected. The voltage of the power rail with the lowest voltage can be used to determine "zero" voltage, such that when the power supply is partially discharged it is partially discharged relative to this value.

In some embodiments, the apparatus further comprises recharge circuitry adapted to recharge the power supply after the power supply has been partially discharged by the discharge circuitry.

Recharge circuitry for recharging the power supply after it has been partially discharged ensures that there is enough charge in the power supply for a further processing operation to be carried out by the processing circuitry. In some examples, recharge circuitry comprises an additional power supply, and in other examples it comprises circuitry configured to deliver power from some external power supply.

In some embodiments, the recharge circuitry is adapted to recharge the power supply by the same amount for different processing operations performed by the processing circuitry.

In this way, the apparatus further obfuscates the amount of charge put into the system, making it even more difficult for an outside observer to determine the power usage of internal components such as the processing circuitry.

In some embodiments, the apparatus further comprises a further power supply adapted to supply power to the processing circuitry while the recharge circuitry is recharging the power supply, wherein the power supply is adapted to charge the further power supply.

The further power supply can, for example, be a capacitor or a battery, and in some embodiments the further power supply is charged by the first power supply. This allows power to be supplied to the processing circuitry while the first power supply is being recharged, allowing for more continuous operation. It also helps to improve obfuscation by separating the recharging and power supply operations—e.g. power can be supplied by the further power supply for a given processing operation while the first power supply is being recharged following use for a previous processing operation.

In some embodiments, the power supply is a capacitor.

Using a capacitor as the power supply is suitable due to its low cost and high durability, in addition to the properties of a capacitor that allow a large voltage to be discharged from the capacitor very rapidly.

In some embodiments, the processing operation is a cryptographic operation.

This is a particularly useful arrangement of the present technology, as it allows for increased security in carrying out cryptographic operations, which can involve very sensitive data that require high security. In a cryptographic operation, knowledge of just a small amount of data from the system—e.g. a cryptographic key—can provide an attacker with the ability to gain access to the system.

BRIEF DESCRIPTION OF THE DRAWINGS

FIGS. 4A and 4B show the charging and discharging of circuit components over p-type and n-type transistors.

DESCRIPTION OF EXAMPLES

Figure 1:
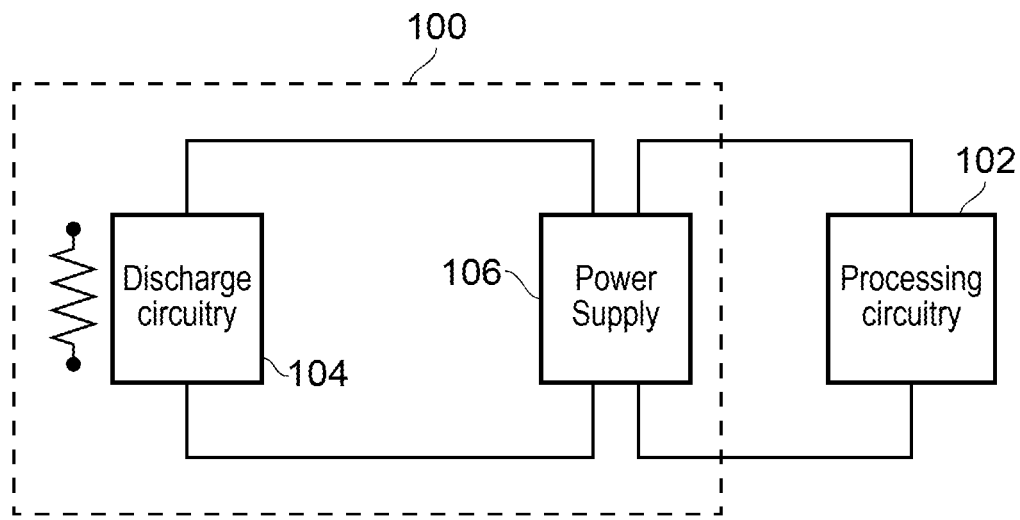
FIG. 1 is an arrangement for securely supplying power to processing circuitry.

FIG. 1 shows apparatus 100 for securely providing power to processing circuitry 102. Apparatus 100 includes discharge circuitry 104 and power supply 106. Power supply 106 is configured to supply power to processing circuitry 102 to provide processing operations. The processing circuitry can be any circuitry configured to perform processing operations including, for example, cryptographic circuitry configured to perform cryptographic operations. The discharge circuitry 104 is configured to partially discharge the power supply 106 after completion of each processing operation by the processing circuitry 102. In some embodiments, the discharge circuitry 104 is configured to discharge the power supply 106 by acting as a resistor, e.g. the discharge circuitry 104 is circuitry specifically designed to provide electrical resistance, such that electrical energy from the power supply 106 is converted to heat in the discharge circuitry 104, which is dissipated internally, within the apparatus. In some embodiments, the discharge circuitry 104 comprises a resistor; in other embodiments, the discharge circuitry 104 comprises components not designed specifically to perform as resistors, but nonetheless arranged specifically to provide the desired level of resistance.

Figure 2:
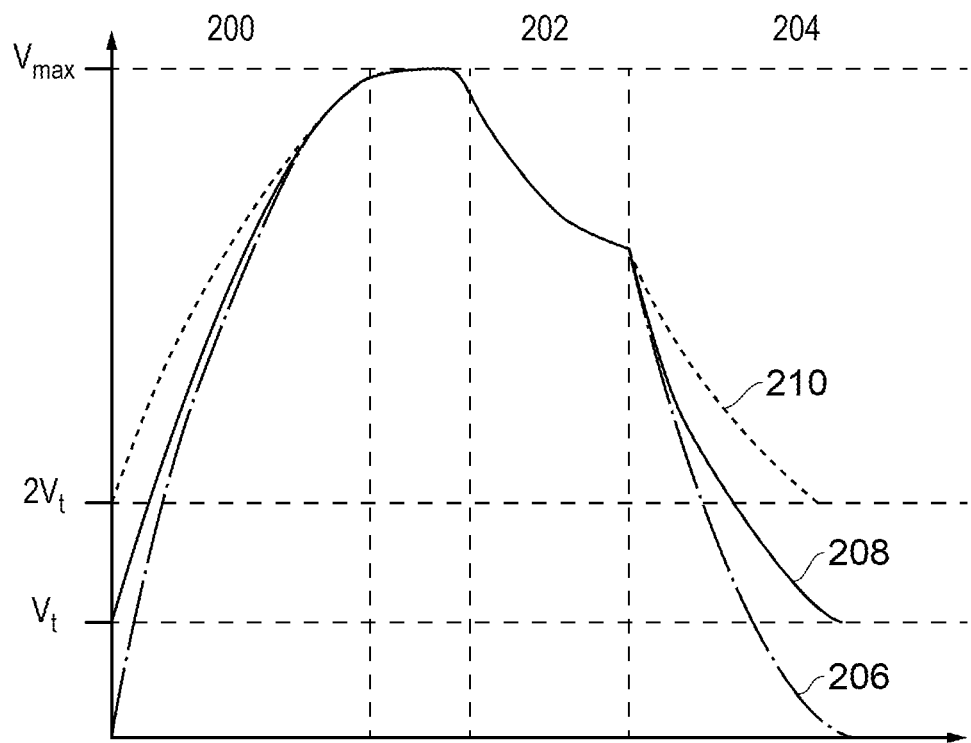
FIG. 2 is a graph of the voltage across a power supply as in FIG. 1 over time.

FIG. 2 shows a graph of the voltage across power supply 106 over time. The figure shows the voltage across the power supply 106 increasing during recharging 200 to $V_{max}$, at which point the power supply 106 is fully charged. In the section of the graph labelled 202, the voltage across the power supply 106 decreases as it supplies power to processing circuitry 102. The region labelled 204 shows the voltage across power supply 106 decreasing as it is discharged across discharge circuitry 104. Line 206 on the graph demonstrates a power supply being fully discharged after a processing operation, while lines 208 and 210 show a power supply 106 being partially discharged to thresholds $V_t$ and $2V_t$ respectively, in accordance with the present technique.

Figure 3:
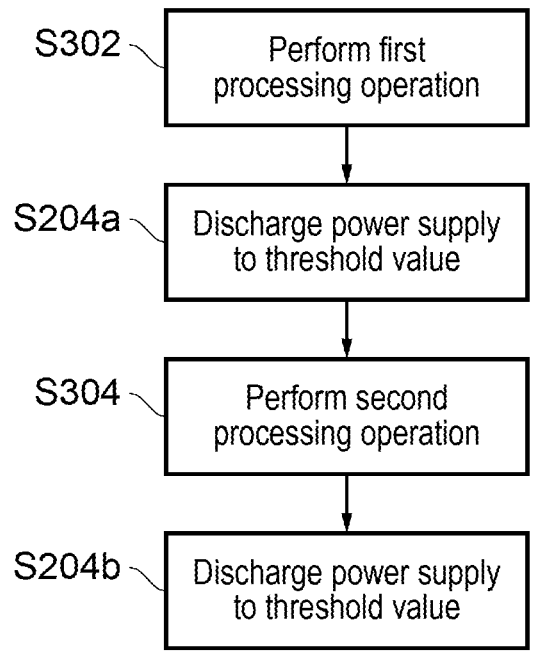
FIG. 3 is a flow diagram showing the response of the apparatus of FIG. 1 to successive processing operations.

In the example shown in FIG. 3, the discharge circuitry 104 discharges the power supply 106 by the same amount after every processing operation. In S302, a processing operation is performed, and in S204a the discharge circuitry 104 partially discharges the power supply 106 to a threshold value $V_t$. In S304, a processing operation different to the processing operation performed in S302 is performed, and in S204b, the discharge circuitry 104 discharges the power supply 106 to the same threshold value $V_t$ as in S204a.

The apparatus and method of FIGS. 1-3 is arranged such that the discharge circuitry partially discharges the power supply 106 to some threshold value $V_t$ after every processing operation performed by the processing circuitry 102. The excess power is dissipated internally as heat. In this way, the charge used by the processing circuitry is obfuscated, such that an external observer is unable to determine how much power is used by the processing circuitry to perform the processing operation. This provides protection against, for example, power analysis side channel attacks, in which an attacker deciphers information based on the power used in processing operations. Such power analysis is particularly dangerous for cryptographic operations, since if an attacker can decipher even a small amount of information about the cryptographic operation performed—for example a key—they can potentially gain access to the system and/or future communications issued by that system.

FIG. 4A shows the voltage over time for a circuit element as it is discharged (i) and charged (ii) over an n-type transistor, and FIG. 4B shows the voltage over time for a circuit element as it is discharged (i) and charged (ii) over a p-type transistor. As shown in FIG. 4B(i), a circuit element discharged by a p-type transistor such as a p-type MOSFET (pMOS) can only be partially discharged to some threshold value $V_1$ (where $V_1$ is greater than zero but less that $V_{max}$), leaving some residual charge. A p-type transistor is therefore sufficient to partially discharge the power supply 106, leaving some residual charge. By contrast, a circuit element discharged by an n-type transistor such as an n-type MOSFET (nMOS) can be fully discharged to zero, leaving no residual charge in the capacitor (FIG. 4A(i). Thus, when power supply 106 is discharged over an n-type transistor, it is fully discharged to zero, and a single n-type transistor would not be sufficient to partially discharge the power supply to some threshold value. It should be noted that zero voltage is intended to mean the lowest possible voltage across that component.

Figure 6:
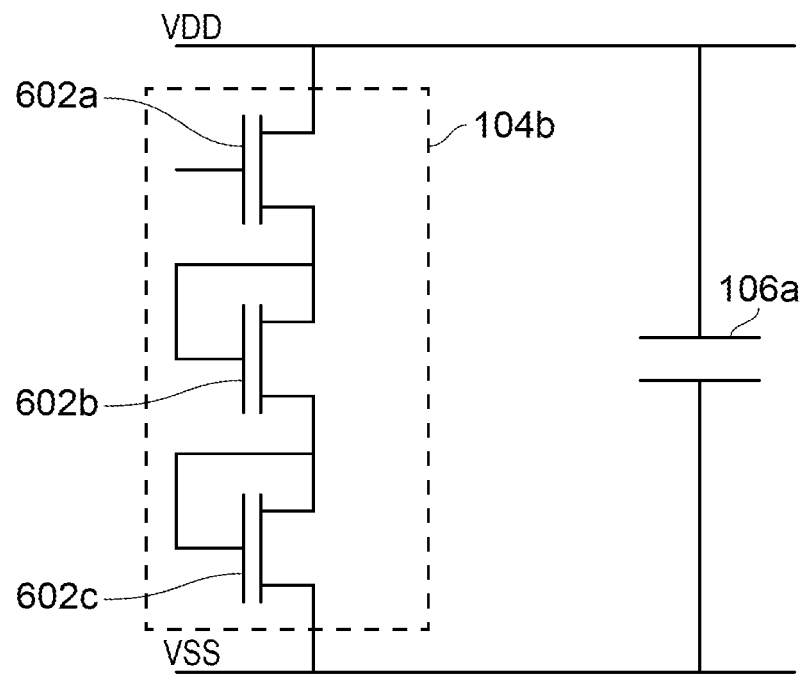
FIG. 6 shows an arrangement of discharge circuitry and power supply in accordance with some embodiments.
Figure 7:
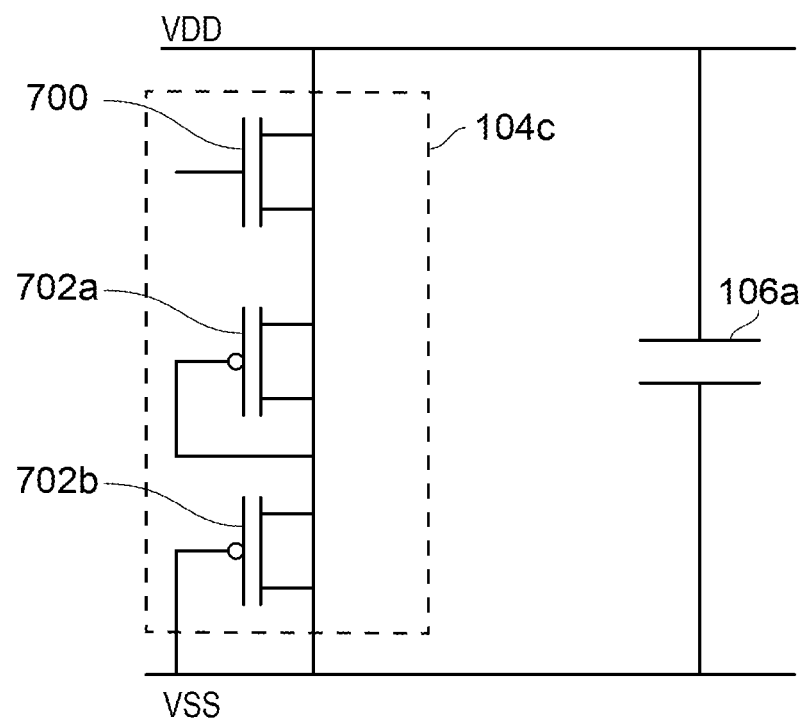
FIG. 7 shows an arrangement of discharge circuitry and power supply in accordance with some embodiments.

Conversely, when a circuit element is charged over a p-type transistor—shown in FIG. 7B(ii)—it can be fully charged to its maximum voltage $V_{max}$, whereas when charged over an n-type transistor (FIG. 4A(ii)) the circuit element can only be charged to some threshold voltage $V_2$ which is less than the maximum voltage $V_{max}$. As described in detail below with reference to FIGS. 6 and 7, this means that if an n-type transistor is provided in series with further transistors, the further transistors can be charged over the n-type transistor as the power supply is discharged. As the further transistors will only be charged to some threshold (according to the properties of the n-type transistor in charging), this means that a residual charge is left in the power supply, and thus the power supply is only partially discharged.

Figure 5:
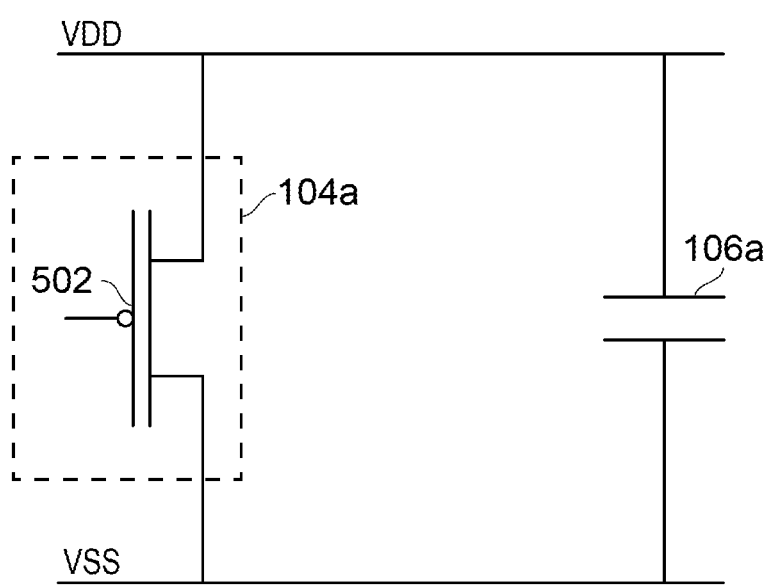
FIG. 5 shows an arrangement of discharge circuitry and power supply in accordance with some embodiments.

FIG. 5 shows an example arrangement according to the present technique, where the apparatus comprises capacitor 106a as the power supply 106 and discharge circuitry 104a, connected between power rails VDD and VSS. Using a capacitor 106a as power supply 106 according to the present technique may be advantageous because capacitors are cheap and durable and are adapted to be quickly charged and discharged; however, it will be appreciated that the capacitor can be replaced by any power supply. Discharge circuitry 104a is adapted to partially discharge capacitor 106a after a processing operation is complete. In this particular embodiment of the present technique, discharge circuitry 104a comprises a p-type transistor 502. Due to the natural threshold of p-type transistors, capacitor 106a is only partially discharged when discharged over transistor 502, leaving a residual charge in the capacitor 106a. Transistor 602 may, for example, be a pMOS transistor, that is, a p-type MOSFET transistor.

FIG. 6 shows an alternative embodiment of the present technology, in which discharge circuitry 104b comprises multiple n-type transistors 602 connected in series. The arrangement in FIG. 6 comprises a capacitor 106a and discharge circuitry 104b, connected between power rails VSS and VDD. Similarly to discharge circuitry 104a in FIG. 5, discharge circuitry 104b is adapted to partially discharge capacitor 106a to some threshold value, in this case by utilising the properties of n-type transistors. In particular, this arrangement makes use of the fact that a circuit element charged over an n-type transistor can only be charged to some threshold value $V_1$, as shown in FIG. 4A(ii). When capacitor 106a is discharged over discharge circuitry 104b, the capacitor 106a charges the first n-type transistor 602a, which in turn charges the second n-type transistor 602b, which in turn charges the third n-type transistor 602c. As transistor 602b is charged over an n-type transistor 602a, transistor 602b can only be charged to some threshold value, leaving a residual charge q, which is stored in capacitor 106a. Likewise, n-type transistor 602c can also only be charged to a threshold value, due to being charged over an n-type transistor 602b, leaving a further residual charge q stored in capacitor 106a. The capacitor 106a is therefore left with a residual charge of 2q. The threshold voltage (and the residual charge) for capacitor 106a can be increased by adding more n-type transistors 602 in series, and it will therefore be appreciated that the number of n-type transistors 602 in the discharge circuitry 104b is not limited to three, but can be any number greater than 1.

FIG. 7 shows a further embodiment of the present technology, in which discharge circuitry 104c comprises an n-type transistor 700 and p-type transistors 702 connected in series. This arrangement utilises both the properties of n-type transistors in charging shown in FIG. 7A(ii) and the properties of p-type transistors in discharging shown in FIG. 7B(i). In FIG. 7, when capacitor 106a is discharged over discharge circuitry 104c, the capacitor first charges n-type transistor 700, which charges a first p-type transistor 702a, which in turn charges a second p-type transistor 702b. As the first p-type transistor 702a is charged over n-type transistor 700, it can only be charged to some threshold value $V_2$, and thus a residual charge q remains in the system. Then, as the first p-type transistor 702a discharges over the second p-type transistor 702b, it can only be discharged to a threshold, leaving a further residual charge of q. Thus, a residual charge of 2q is left in capacitor 106a. As in the previous embodiment, the threshold value to which capacitor 106a is discharged can be increased by adding more n-type transistors, and it can also be increased by adding more p-type transistors. Thus it will be appreciated that the embodiment shown in FIG. 7 is not limited to one n-type transistor 700 and two p-type transistors 702 as shown, but any number of n-type and p-type transistors can be used.

FIGS. 5, 6 and 7 show various configurations of discharge circuitry 104 according to the present technology, however it will be appreciated that any arrangement of the discharge circuitry 104 that allows the power supply 106 to be partially discharged may be used. In general, this may be a single p-type transistor as in FIG. 5, multiple transistors of one or both of p-type and n-type, or any other configuration that would give the same result.

Some embodiments of the present technique include power rails VDD and VSS. Power rails VDD and VSS are arranged to have a voltage between them, and the discharge circuitry and power supply are connected between the power rails, as shown in FIGS. 5-7, such that the power rails VDD and VSS supply charge between the power supply and discharge circuitry.

In some embodiments, the threshold value to which the power supply 106 is discharged is the same each time the power supply 106 is discharged. In other embodiments, the threshold value may be variable. In any of FIGS. 5-7, a fixed threshold can be used, however the arrangements in FIGS. 6 and 7 can also be configured to provide a variable threshold, where the threshold can be decreased by bypassing one or more of the transistors in the discharge circuitry. If the threshold value for a given transistor is $V_t$, then each additional transistor included in series increases the threshold by $V_t$. FIG. 2 shows examples of thresholds like this, with 208 showing a threshold of $V_t$, for example in apparatus comprising a single p-type transistor, and with 210 showing a threshold of $2V_t$, for example in apparatus comprising two p-type transistors in series.

Figure 8:
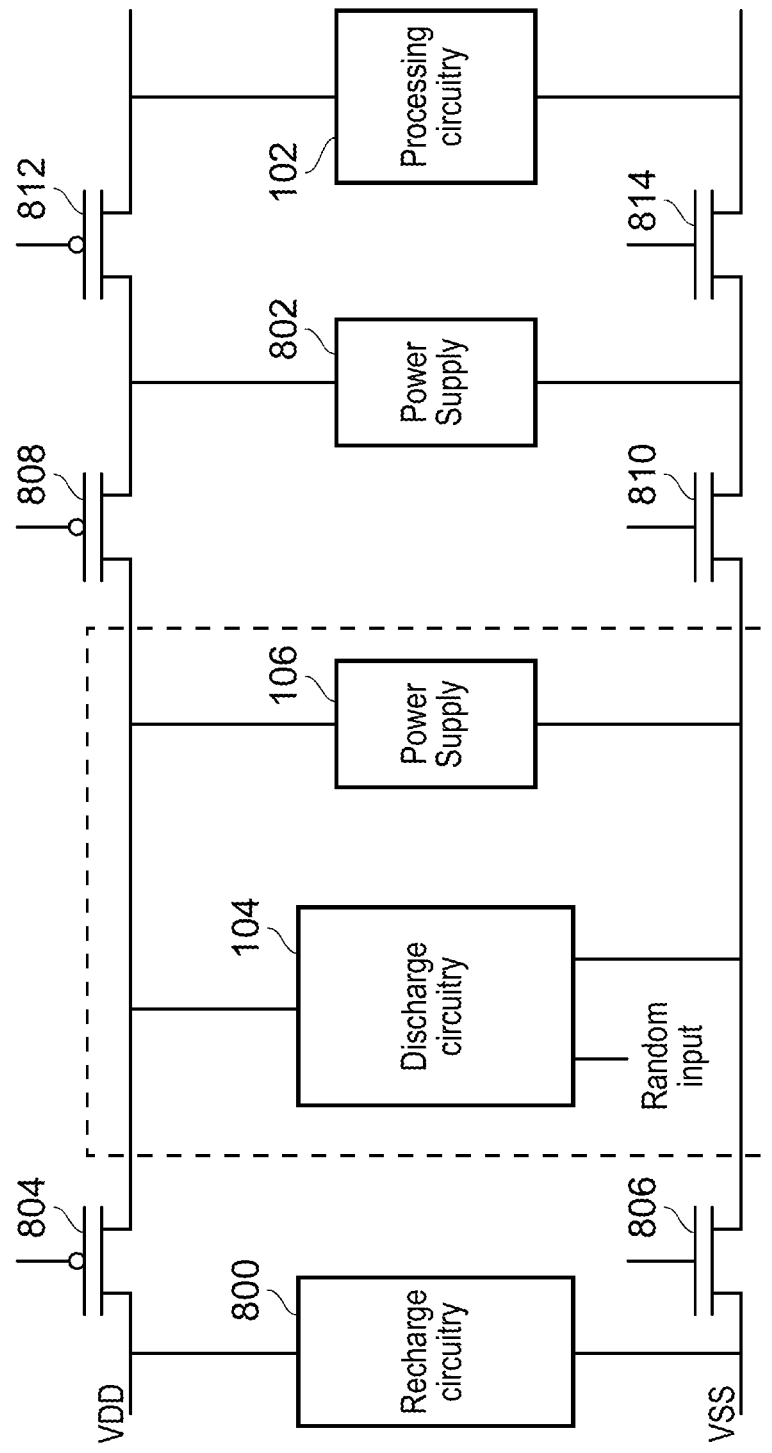
FIG. 8 shows an arrangement for securely providing power to processing circuitry in accordance with some embodiments.

FIG. 8 shows an embodiment of the present technique, including a power supply 106, discharge circuitry 104 configured to partially discharge power supply 106. The power supply 106, discharge circuitry 104 and processing circuitry 102 are all connected between power rails VDD and VSS, which supply power from recharge circuitry 800 to the power supply 106 in order to recharge it, and also connect the power supply 106 to the processing circuitry 102 such that the power supply 106 can supply power to the processing circuitry 102, as well as connecting the power supply 106 to the discharge circuitry 104 such that the power supply 106 can be discharged across the discharge circuitry 104. Power rail VSS defines zero voltage for the system. The apparatus of FIG. 8 also includes a further power supply 802 connected between power rails VDD and VSS, arranged such as to supply power to the processing circuitry 102 while power supply 106 is being recharged or discharged. FIG. 8 also shows six transistors configured to act as switches, including refresh transistors 804 and 806, transfer transistors 808 and 810, and power supply transistors 812 and 814. The transistors 804-814 are interchangeably be referred to herein as switches. The transistors 804-814 may be MOSFETs, however it will be appreciated that any other power switches can be used in place of transistors 804-814, or any other components configured to regulate the flow of electricity in the circuit.

Figure 9:
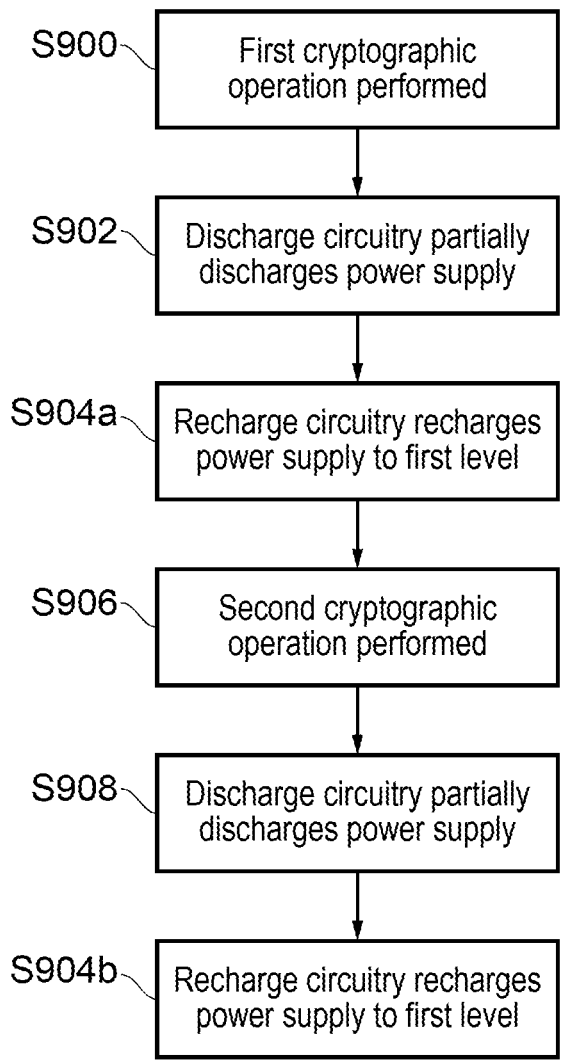
FIG. 9 is a flow diagram showing successive recharge operations by recharge circuitry as in FIG. 8.

FIG. 9 shows recharging operations performed by the recharge circuitry 800. In S900, a processing operation is performed by processing circuitry 102. In S902, the power supply 106 is partially discharged and in S904a the power supply 106 is recharged by the recharge circuitry 800 to some first level. In S906, a second processing operation different to the first processing operation is performed. In S908 the discharge circuitry 104 partially discharges the power supply 106 and in S904b the recharge circuitry 800 recharges the power supply 106 to the same first level. The recharge circuitry 800 is arranged to recharge the power supply 106 to the same level after every processing operation.

Figure 10:
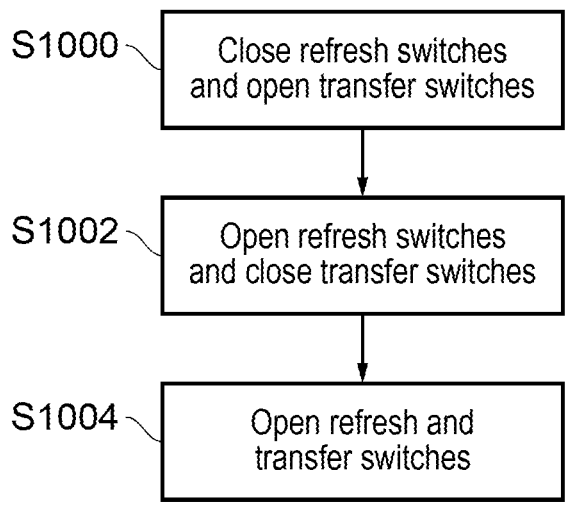
FIG. 10 is a flow diagram of an example method of operation of the apparatus in FIG. 8.

FIG. 10 shows is a flow diagram showing a method by which the apparatus of FIG. 8 can be operated. Switches 804, 806, 808, 810, 812 and 814 allow the processes of charging the further power supply 802, providing power to the processing circuitry 102, discharging the power supply 106 or charging the power supply 106 to be isolated from one another. For example, allowing the further power supply 802 to be charged without the power supply 106 being discharged. In S1000, refresh switches 804 and 806 are closed and transfer switches 808 and 810 are left open. This allows the power supply 106 to be charged. Once the power supply 106 is fully charged, in S1002 both refresh switches 804 and 806 are opened and transfer switches 808 and 810 are closed. This allows power supply 106 to charge power supply 802 until the two power supplies reach equilibrium. Alternatively, if power supply 802 is not present, the power supply 106 can be configured to supply power directly to processing circuitry 102. The processing circuitry 102 carries out some processing operation, after which —or after the power supplies 106 and 802 have reached equilibrium— in S1004, the transfer switches 808 and 810 are opened, allowing power supply 106 to be partially discharged across the discharge circuitry 104, while power supply 802 is arranged to supply power to processing circuitry 102 by closing both power supply switches 812 and 814. As refresh switches 804 and 806 and transfer switches 808 and 810 are all open, the discharging of the power supply 106 over the discharge circuitry 104 is undetectable to an outside observer. The discharge circuitry 104 discharges the power supply 106 by acting as a resistor, converting electrical power stored in the power supply 106 to heat, which is dissipated within the apparatus.

The present technique obfuscates the amount of charge used by the processing circuitry 102 in performing a processing operation by discharging the power supply 106 to some threshold value after every processing operation. There is no way for an external observer measuring the power usage of the system to determine how much power was used by the processing circuitry 102 to perform a particular processing operation, as there is no practical way for such an observer to determine how much power was dissipated as heat in the system and how much was used in the processing operation. This protects the apparatus from cryptographic attacks such as power analysis side channel attacks.

The apparatus may be configured to discharge the power supply 106 to the same threshold value after each processing operation, regardless of what type of processing operation is performed. This ensures that the power used by the system is the same for every processing operation, obscuring the amount of charge used by the power supply.

Alternatively, the apparatus may be configured to vary the threshold value. The threshold value may, for example, be selected at random after each processing operation. This removes all predictability from the system and provides an additional level of obfuscation, further improving the security of the system.

The present technique is particularly advantageous in operations that require high security, for example cryptography. Therefore, the processing circuitry 102 may be cryptographic circuitry configured to carry out cryptographic operations; however, the processing circuitry 102 may be any other type of processing circuitry configured to carry out any type of processing operation.

Figure 11A:
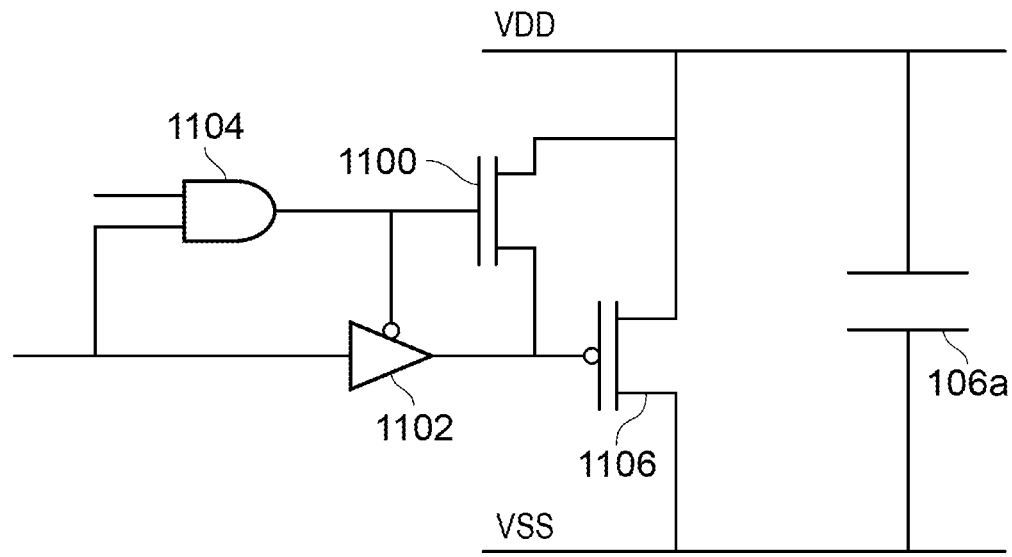
FIGS. 11A and 11B show a configuration for programming a threshold value to which the power supply is to be partially discharged in accordance with some embodiments.
Figure 11B:
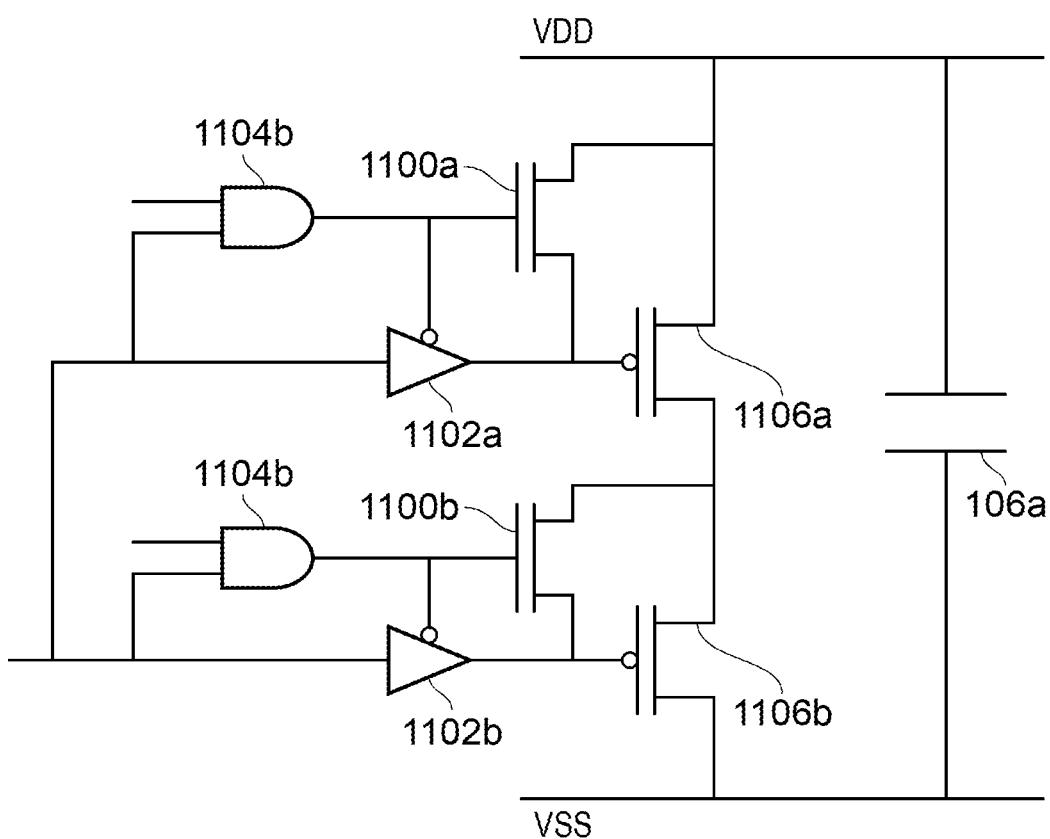

FIGS. 11-12 show embodiments of the present technique that are programmable, that is they can be controlled using program logic. FIG. 11A shows an example of how AND gate 1104 and buffer 1102 can be arranged along with transistor 1100 such that they can be used to activate or deactivate transistor 1106. FIG. 11B shows how this design can be extended to multiple transistors 1106. This allows the threshold value to which capacitor 102 is discharged to be varied by selectively activating or deactivating transistors 1106. The arrangement in FIG. 11 is known as an "active low" configuration.

Figure 12A:
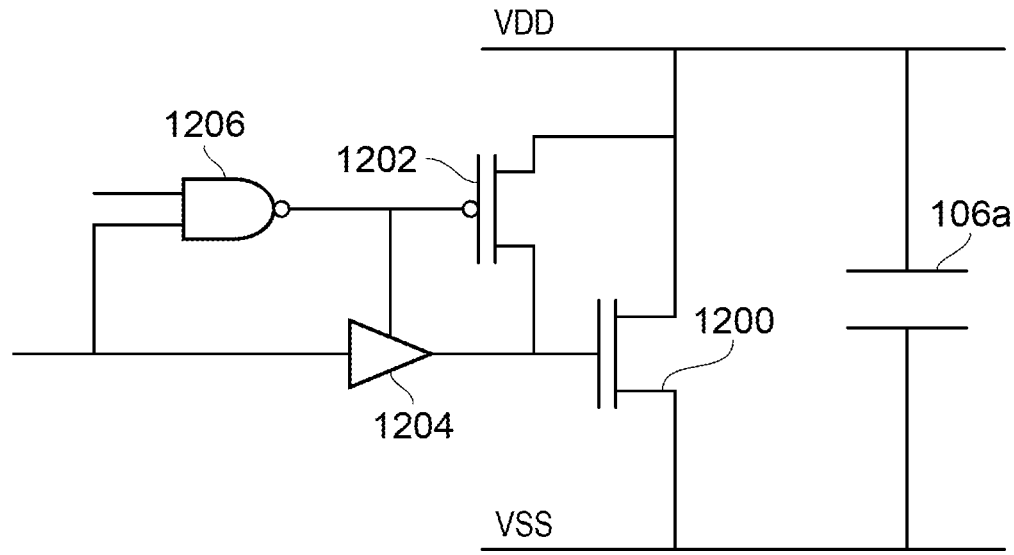
FIGS. 12A and 12B show a configuration for programming a threshold value to which the power supply is to be partially discharged in accordance with some embodiments.
Figure 12B:
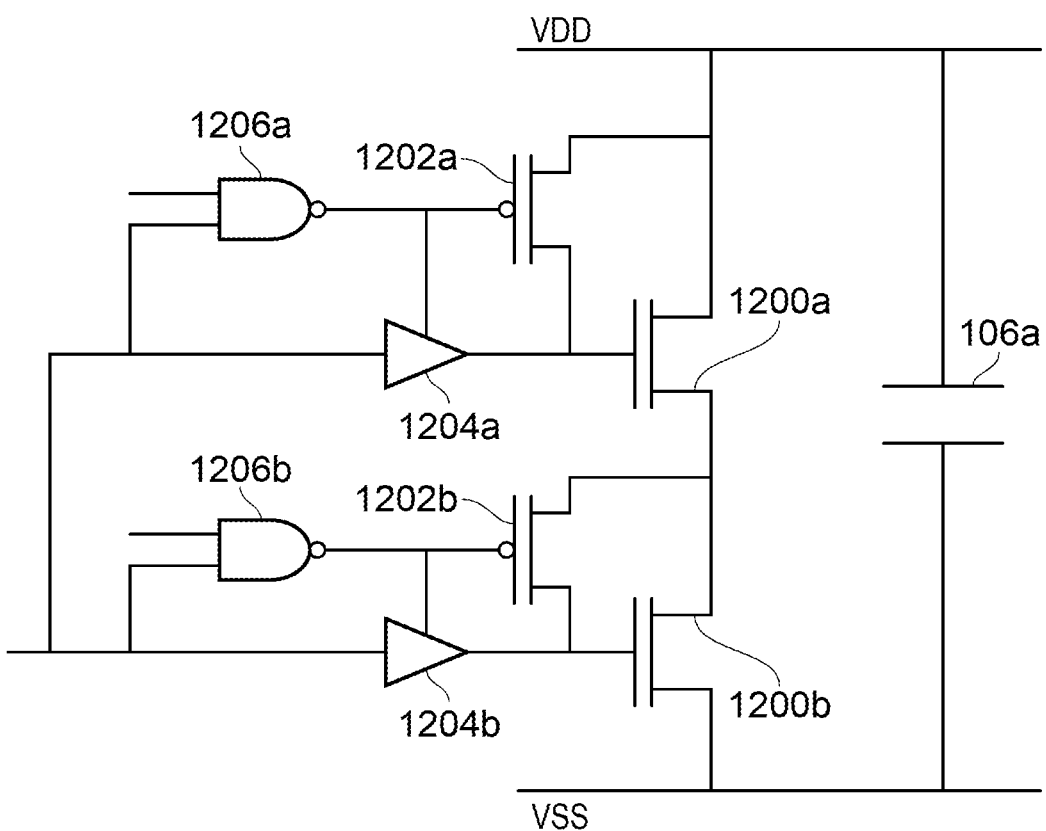

FIG. 12 shows an "active high" configuration of a programmable embodiment of the present technique. FIG. 12A shows a buffer 1204, transistor 1202 and AND gate 1206 configured to activate or deactivate transistor 1200 based on inputs to AND gate 1206. FIG. 12B shows how this configuration can be extended to multiple transistors 1200.

It will be appreciated that although FIGS. 11B and 12B only show two transistors in series, configured to be selectively activated or deactivated, this arrangement could be extended to any number of transistors 1106/1200.

FIGS. 11-12 show how the threshold value for the capacitor 106a can be varied. The threshold value can hence be selected from a number of values, each multiples, dependent on how many transistors 1106/1200 are activated. There are numerous ways in which the threshold value can be chosen, for example the threshold value may be chosen at random. This further improves the security of the system by removing any predictability from the power consumption of the system. The threshold value may be chosen at random based on some random input, for example a random number may be generated and a number of transistors equalling that number may be activated. It will be appreciated that there are many ways of making a random choice of the threshold value, and any method may be used. Furthermore, it will be appreciated that it is often not practical to make a truly random choice, so it will be appreciated that "random" in the context of this application is intended to also mean a selection made in a pseudo-random manner.

The programmable embodiments of the present technique depicted in FIGS. 11-12 can be controlled by a computer program comprising program instructions. FIG. 13 shows an example of a non-transitory computer readable storage medium 1300 configured to store the program instructions.

In the present application, the words "configured to . . . " and "adapted to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An apparatus comprising:
a power supply adapted to supply power to processing circuitry to perform a processing operation;
discharge circuitry adapted to partially discharge the power supply to an incomplete discharge state after the processing operation is complete,
wherein the discharge circuitry is adapted to discharge the power supply to a threshold value and to vary the threshold value by selectively activating or deactivating elements in the discharge circuitry; and
selection circuitry adapted to select the threshold value from at least two predetermined values based on at least one random input.

2. An apparatus according to claim 1, wherein
the discharge circuitry is adapted to partially discharge the power supply by acting as a resistor.

3. An apparatus according to claim 1, wherein
the threshold value is the same for different processing operations performed by the processing circuitry between occurrences of the threshold value being varied by the discharge circuitry.

4. An apparatus according to claim 1, wherein
the at least two predetermined values are multiples.

5. An apparatus according to claim 1, wherein
the discharge circuitry comprises a first transistor.

6. An apparatus according to claim 5, wherein
the first transistor is a p-type transistor.

7. An apparatus according to claim 5, wherein
the discharge circuitry further comprises a second transistor connected to the first transistor in series.

8. An apparatus according to claim 1, further comprising:
a first power rail and a second power rail arranged such that the power supply and the discharge circuitry are each connected between the first power rail and the second power rail; the first power rail and the second power rail being adapted to deliver charge to and from the power supply.

9. An apparatus according to claim 1, further comprising:
recharge circuitry adapted to recharge the power supply after the power supply has been partially discharged by the discharge circuitry.

10. An apparatus according to claim 9, wherein
the recharge circuitry is adapted to recharge the power supply by the same amount for different processing operations performed by the processing circuitry.

11. An apparatus according to claim 9, further comprising:
a further power supply adapted to supply power to the processing circuitry while the recharge circuitry is recharging the power supply, wherein the power supply is adapted to charge the further power supply.

12. An apparatus according to claim 1, wherein
the power supply is a capacitor.

13. An apparatus according to claim 1, wherein
the processing operation is a cryptographic operation.

14. A method comprising:
supplying power from a power supply to processing circuitry to perform a processing operation;
partially discharging the power supply across discharge circuitry to an incomplete discharge state once the processing operation is complete, wherein the power supply is discharged to a threshold value;
varying the threshold value by selectively activating or deactivating elements in the discharge circuitry; and
selecting the threshold value from at least two predetermined values based on at least one random input.

15. A non-transitory computer readable storage medium storing program instructions configured to cause a computer to carry out the method of claim 14.

* * * * *